US009254438B2

(12) United States Patent
Finn et al.

(10) Patent No.: US 9,254,438 B2
(45) Date of Patent: Feb. 9, 2016

(54) APPARATUS AND METHOD TO TRANSITION BETWEEN A MEDIA PRESENTATION AND A VIRTUAL ENVIRONMENT

(75) Inventors: Peter G. Finn, Brampton (CA); Rick Allen Hamilton, II, Charlottesville, VA (US); Dana H. Hangai, Charlottesville, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 12/568,924

(22) Filed: Sep. 29, 2009

(65) Prior Publication Data

US 2011/0077085 A1    Mar. 31, 2011

(51) Int. Cl.
*A63F 13/12*    (2006.01)
*A63F 13/30*    (2014.01)

(52) U.S. Cl.
CPC ......... *A63F 13/12* (2013.01); *A63F 2300/5506* (2013.01); *A63F 2300/5553* (2013.01); *A63F 2300/5573* (2013.01); *A63F 2300/5593* (2013.01); *A63F 2300/609* (2013.01); *A63F 2300/632* (2013.01); *A63F 2300/6669* (2013.01); *A63F 2300/807* (2013.01)

(58) Field of Classification Search
CPC ............ A63F 13/12; A63F 2300/5506; A63F 2300/5553; A63F 2300/5573; A63F 2300/807; A63F 2300/609; A63F 2300/632; A63F 2300/6669; A63F 2300/5593
USPC .......................................... 463/31–32, 42–43
See application file for complete search history.

(56) References Cited

U.S. PATENT DOCUMENTS

| | | | |
|---|---|---|---|
| 6,072,496 A * | 6/2000 | Guenter et al. | 345/419 |
| 6,478,680 B1 | 11/2002 | Yoshioka et al. | |
| 6,769,009 B1 * | 7/2004 | Reisman | 709/201 |
| 6,789,077 B1 * | 9/2004 | Slaughter et al. | 1/1 |
| 6,862,594 B1 * | 3/2005 | Saulpaugh et al. | 1/1 |
| 6,950,791 B1 * | 9/2005 | Bray et al. | 703/22 |
| 7,010,569 B2 | 3/2006 | Okayasu et al. | |
| 7,036,082 B1 | 4/2006 | Dalrymple et al. | |
| 7,293,235 B1 | 11/2007 | Powers et al. | |
| 7,298,378 B1 | 11/2007 | Hagenbuch et al. | |
| 7,301,547 B2 * | 11/2007 | Martins et al. | 345/633 |

(Continued)

OTHER PUBLICATIONS

Luna, Frank, "Introduction to 3D Game Programming with DirectX 10", copyright 2008 Wordware Publishing Inc. Sudbury, MA, p. 144.*

(Continued)

*Primary Examiner* — Jasson Yoo
(74) *Attorney, Agent, or Firm* — Whitham, Curtis, Christofferson & Cook, P.C.; Maeve L. McCarthy

(57) ABSTRACT

A virtual universe application and a media (e.g. 3-D movie) presentation application communicate with each other to obtain a location of a current activity application and find, using a search engine or a content addressable index developed during use, a corresponding location accessible from the other application to synchronize the location and time of location and time of scenes in both applications. Point of view can optionally be synchronized and additional search criteria or parameters can be applied to find the best match of views presented to a user when the user toggles between the VU location and the media presentation.

16 Claims, 5 Drawing Sheets

(56) References Cited

U.S. PATENT DOCUMENTS

| | | | |
|---|---|---|---|
| 7,752,648 B2* | 7/2010 | Shelton et al. | 725/136 |
| 7,951,000 B2* | 5/2011 | Sakaguchi et al. | 463/31 |
| 2002/0049814 A1* | 4/2002 | Yoo | 709/205 |
| 2002/0188678 A1 | 12/2002 | Edecker et al. | |
| 2005/0060741 A1* | 3/2005 | Tsutsui et al. | 725/32 |
| 2005/0206610 A1 | 9/2005 | Cordelli | |
| 2008/0147311 A1 | 6/2008 | Zoller et al. | |
| 2008/0153591 A1 | 6/2008 | Deligiannidis | |
| 2008/0262910 A1 | 10/2008 | Altberg et al. | |
| 2008/0320041 A1 | 12/2008 | Engelsma et al. | |
| 2009/0037822 A1* | 2/2009 | Kandekar et al. | 715/733 |
| 2009/0055249 A1 | 2/2009 | Liebermann | |
| 2009/0100352 A1* | 4/2009 | Huang et al. | 715/757 |
| 2009/0144267 A1* | 6/2009 | Cook et al. | 707/5 |
| 2009/0158161 A1 | 6/2009 | Gibbs et al. | |
| 2009/0177980 A1 | 7/2009 | Leahy et al. | |
| 2009/0210301 A1 | 8/2009 | Porter et al. | |
| 2009/0240659 A1 | 9/2009 | Ganz et al. | |
| 2009/0318223 A1* | 12/2009 | Langridge et al. | 463/31 |
| 2010/0083169 A1 | 4/2010 | Athsani et al. | |
| 2010/0162149 A1 | 6/2010 | Sheleheda et al. | |
| 2010/0169796 A1 | 7/2010 | Lynk et al. | |
| 2010/0203952 A1* | 8/2010 | Zalewski | 463/23 |
| 2010/0299618 A1 | 11/2010 | Pare | |
| 2011/0047267 A1 | 2/2011 | Syvain et al. | |
| 2011/0077085 A1 | 3/2011 | Finn et al. | |
| 2011/0078170 A1 | 3/2011 | Finn | |

OTHER PUBLICATIONS

Coto, et al., The Computer Game "Spycraft: The Great Game", Feb. 29, 1996, Published by Activision, as evidenced by the web document http://lparchive.org/Spycraft/, Part 4, downloaded by the USPTO on Oct. 15, 2012.*

Various authors, Wikipedia Article "Spycraft: The Great Game", Aug. 30 2009 version, downloaded by the USPTO from http://en.wikipedia.org/w/index.php?title=Spycraft:_The_Great_Game&oldid=310857654 on Oct. 16, 2012.*

Coto et al.; The Computer Game "Spycraft: The Great Game", Feb. 29, 1996, Published by Activision, as evidenced by the web document http://lparchive.org/Spycraft/, Part 4.

Various Authors; Wikipedia Article "Spycraft: The Great Game", Aug. 30, 2009 version.

Frank Luna; "Introduction to 3D Game Programming with DirectX 10", copyright 2008 Wordware Publishing, Inc., Sudbury, MA, p. 144.

* cited by examiner

… (1) …

APPARATUS AND METHOD TO TRANSITION BETWEEN A MEDIA PRESENTATION AND A VIRTUAL ENVIRONMENT

CROSS-REFERENCE TO RELATED APPLICATIONS

This invention is related to a previous invention by the same inventors entitled "Routing a Teleportation Request Based on Grid Compatibility with User Contexts," U.S. patent application Ser. No. 12/568,802 entitled "Routing a Teleportation Request Based On Grid Compatibility With User Contexts", the content of which is fully incorporated herein by reference.

FIELD OF THE INVENTION

The present invention generally relates to interactive virtual universes presented to users on computers linked by a network and, more particularly, to facilitating transition between a media presentation and a similar location in a virtual universe for a user.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game at will by numerous participants.

As a synthesis of such games with other capabilities of the Internet such as interactive chat rooms, advertising and marketing and access to massive amounts of information and the like, so-called virtual environments (sometimes referred to as "virtual universes", "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which can move through the regions of the virtual universe represented by 3-D graphics and landscapes which may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof.

In short, an avatar controlled by a resident can interact with other avatars, objects and portions of the immediate environment of the avatar in much the same way a person would interact with other persons, objects and portions of the environment in the real world but where transportation between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee. Many entities have found it advantageous to provide VU environments closely resembling real world facilities or locales to allow users to experience, though avatars and with a significant degree of realism, particular locales in the real world and a sampling of the likely inhabitants thereof.

SUMMARY OF THE INVENTION

The present invention provides a method and apparatus for locating portions of media presentations or VU locations which correspond with each other more or less closely and thus allow a user of a networked computer to toggle back and forth between them at will and as seamlessly as possible.

In order to accomplish these and other objects of the invention, a method for associating an interactive virtual universe (VU) location and locations of scenes of a media presentation is provided, comprising obtaining metadata corresponding to at least a location and a time of a location in at least one of a media presentation and a VU location, finding a VU location or a media presentation, scene, respectively, corresponding to said metadata such that the media presentation and the VU location correspond to each other, and toggling between said media presentation and said VU location.

In accordance with another aspect of the invention, a computer program product is provided comprising signals recorded on a machine-readable medium or delivered over a communication link which, when run on a computer, cause the computer to perform steps of obtaining metadata corresponding to at least a location and a time of a location in at least one of a media presentation and a VU location, finding a VU location or a media presentation scene, respectively, corresponding to said metadata such that the media presentation and the VU location correspond to each other, and toggling between said media presentation and said VU location.

In accordance with a further aspect of the invention, an apparatus for toggling between a virtual universe (VU) application and a media presentation application is provided comprising memory for storing location and time metadata of a current activity comprising one of said VU application and said media presentation application; a search engine for finding a corresponding location in one of a VU accessible by said VU application and a media presentation accessible from said media presentation application which is not said current activity; and an interface for selecting and communicating to a user an output of one of said VU application and said media presentation application.

In accordance with yet another aspect of the invention, a location correspondence service is provide comprising provision of a program through a network for configuring a networked computer or computer terminal to provide memory for storing location and time metadata of a current activity comprising one of said VU application and said media presentation application; a search engine for finding a corresponding location in one of a VU accessible by said VU application and a media presentation accessible from said media presentation application which is not said current activity; and an interface for selecting and communicating to a user an output of one of said. VU application and said media presentation application.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
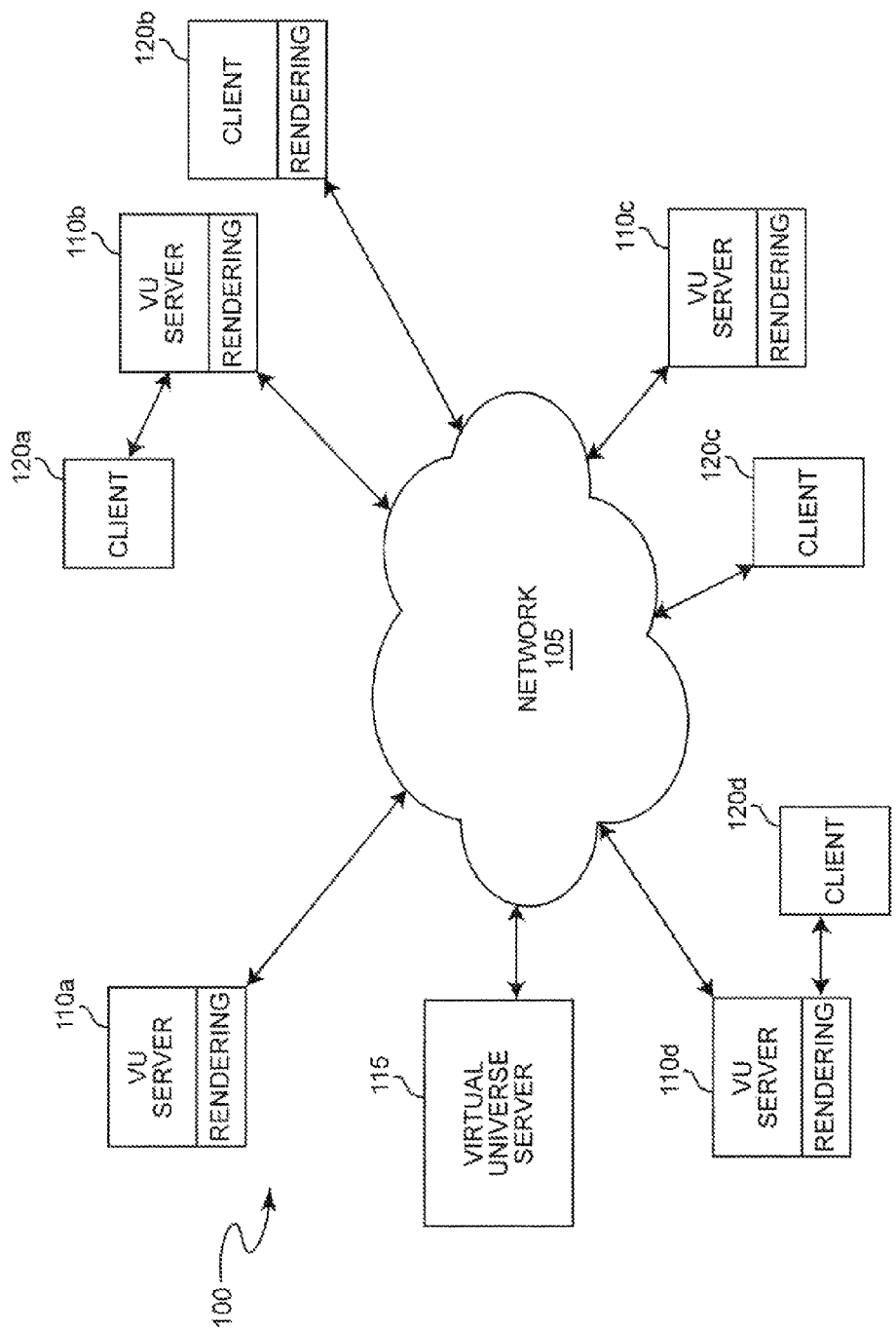
FIG. 1 is a high-level block diagram or data flow diagram of a network-based virtual universe.
Figure 2:
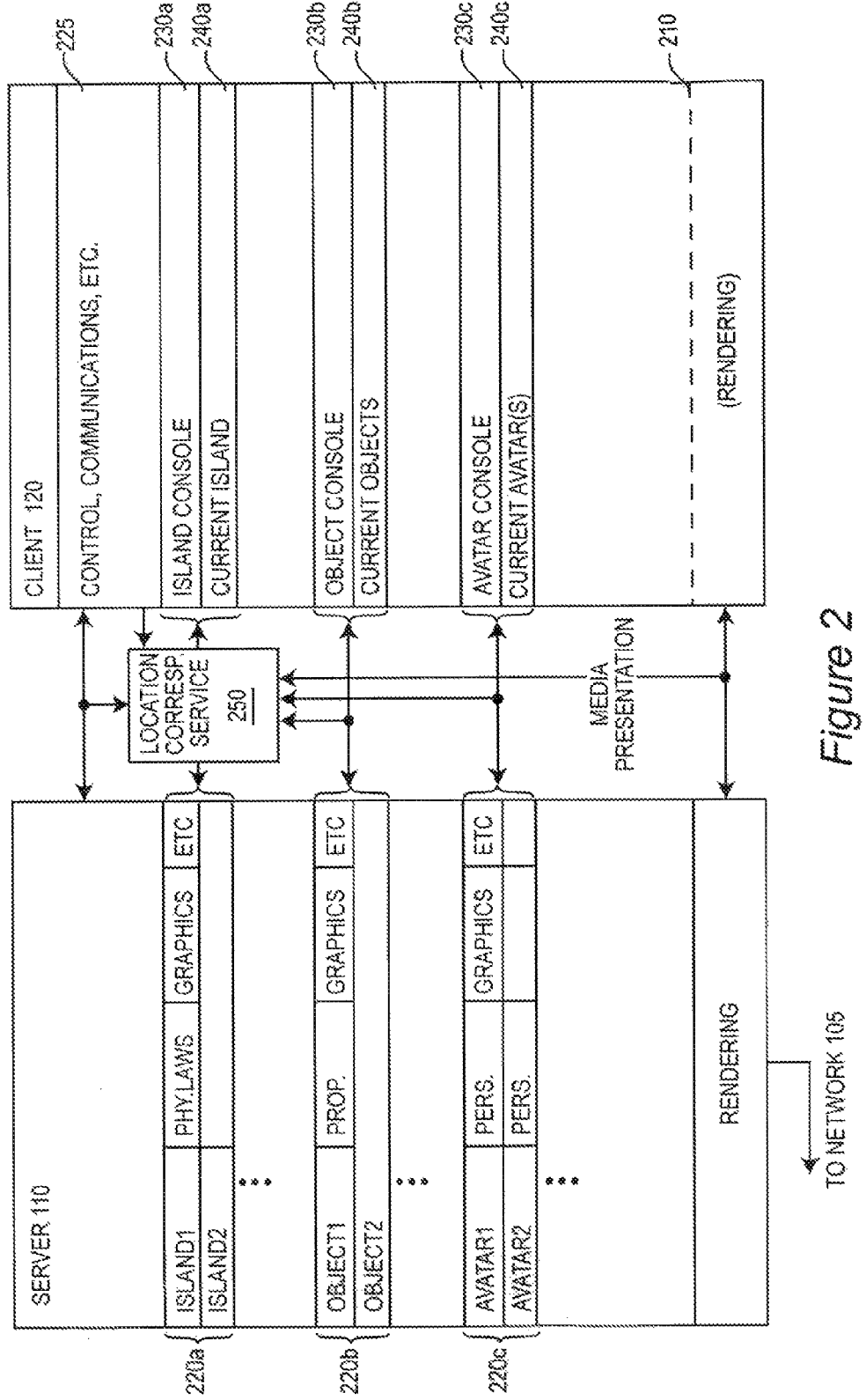
FIG. 2 is a similarly high-level block diagram of some details of the client 120 and server 110 generally provided for participation in a virtual universe.

Referring now to the drawings, and more particularly to FIG. 1, there is shown there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure and integration of the invention with a VU is generally depicted in FIG. 2.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportations between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

Figure 5:
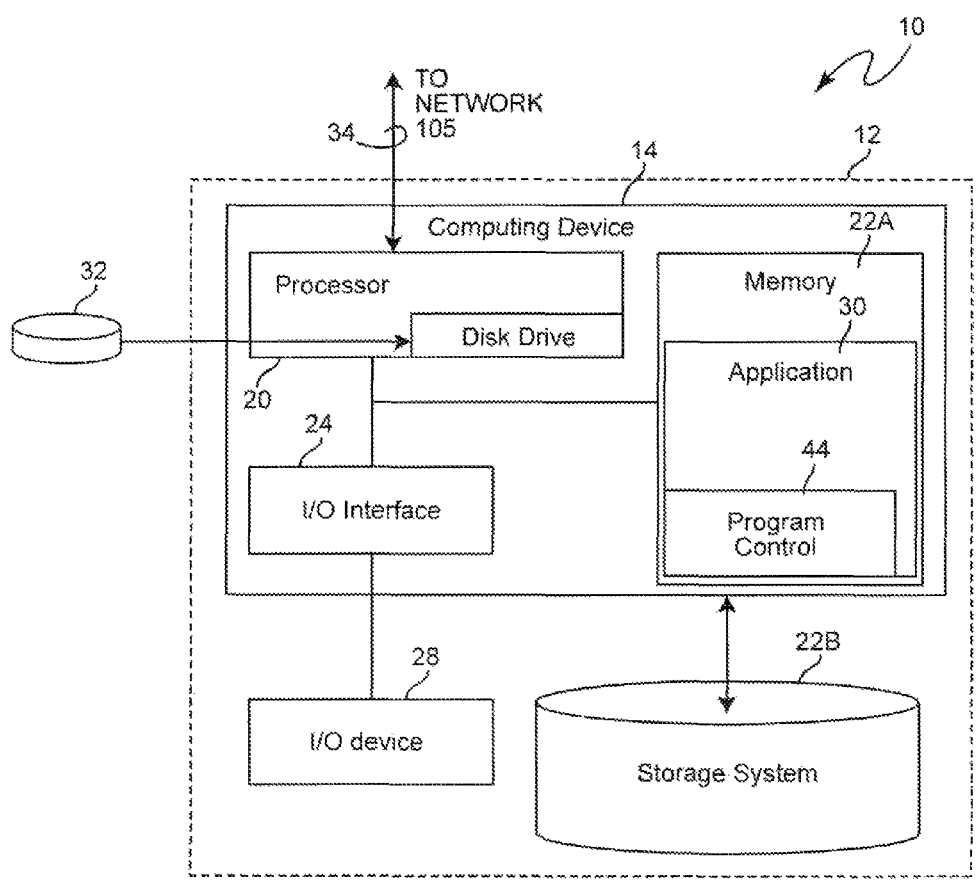
FIG. 5 is a schematic illustration of a computer or terminal architecture suitable for practice of the invention.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 5 and discussed below.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for rendering to be done most expeditiously. For example, when rendering is required at, for example, client 120a for interaction of a particular avatar with an object while changing location on an island, the rendering (including occlusion or hidden line processing) could be performed at the local server 110b or distributed over any or all of servers 110a-110d and possibly even including some client terminals (e.g. 120b) having rendering capability depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering to the network or a local client from a server (e.g. as compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor(s)

which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor.

In order to create islands, objects and avatars, some arrangement for doing so, preferably a graphic user interface (GUI) which may be in the form of one or more screens (possibly nested) functioning as a console 230a-230c may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220a, 220b and 220c for islands, objects and avatars, respectively. Similar GUIs 240a-240c are also provided (but preferably resident on the client processor) for control of the current island, object(s) and/or avatar, once it has been created. Suitable arrangements for providing GUIs or consoles 230a-230c and GUIs 240a-240c are known and others providing enhanced user/resident conveniences are foreseeable. The current island (220a) with its associated objects (220b) correspond to the current location of the current avatar (220c) and are thus the object of teleportation or relocation invitations to which the present invention is directed for management thereof as will now be discussed.

Some definitions which will be helpful in the following discussion are:

1. Avatar—an avatar is a graphical representation the user/resident selects that others can see, often taking the form of a cartoon-like human but which can be produced with any degree of detail, whether realistic or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user (much in the manner of a "bookmark" in the Internet) and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as PEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas to change the position of an avatar within an island and the orientation of the avatar can be changed at the will of the user. Teleporting provides a mechanism to travel rapidly from one VU location to another VU location even if the locations are geographically (e.g. in the context of the topology of a particular VU) far apart such as on different islands or even in different virtual universes. As indicated above, a user can teleport to any other location of which he may be aware.

Networked computers or computer terminal-like devices (e.g. a television interface accessory having a keyboard and possibly other user input devices) are commonly used for a variety of activities such as research or communication and including entertainment as well by receiving video presentations as streaming video and audio programming or accessing virtual universes and video games. A user may thus switch between such functions at will and may even perform some or all of these activities concurrently.

A user may wish to interact with a portion of a VU which is compatible with or closely resembles a media presentation such as a so-called 3-D movie or, conversely, would like to view such a media presentation that involves the environment represented by a VU location currently being experienced through an avatar. While it is currently possible to toggle (e.g., switch back and forth) between different, independent applications concurrently running on a computer, the environmental context of the VU may change through a change of location of an avatar within the VU. Similarly, a media presentation may involve a sequence of locations. Thus any correspondence between a location in a VU and a location depicted in a media presentation must be performed manually and manual operations to do so are, at a minimum, highly distracting and may be time-consuming and frustrating.

For example, a user may be watching a movie having to do with a particular location and/or time period and, since the movie is not likely to be interactive or interactive only to a limited degree, wish to virtually experience a particular location in a more fully interactive manner. Conversely, a user having an avatar in a particular VU location may wish to obtain further information about a particular locale through viewing a portion of a movie made there or documentary about some historical event associated with that location. Currently no facility exists to even inform a user of the existence of parallel or otherwise contextually related locations on the same or other interoperable virtual universes or media presentations which may correspond to some degree to a VU location. At present, a user must rely on "word-of-mouth" information, published lists of locations (in which detail is likely to be very limited) or the like.

Nevertheless, the last few years have seen the development of video games having themes similar to those of popular movies and public interest in such parallel products appears to be increasing. Moreover some media presentations have been successfully marketed in a form which allows limited interactivity such as alteration of the point of view of a scene through zooming and panning and the like similar to familiar manipulations of a camera. It is likely that such products will be produced with significantly greater frequency in the future. Further, given the large library of media presentations (e.g. movies) that now exists, popularity of such parallel products and interactivity indicates that a significantly richer experience can be provided through allowing substantially full interactivity with a media presentation or allowing a VU experience to be supplemented by a related media presentation.

Thus, a facility for experiencing a media presentation in connection with and corresponding to a VU location is provided by the present invention. The invention can thus be generally characterized as a location correspondence service functioning autonomously in the manner of a proxy or agent to maintain information regarding correspondence of media presentations and VU locations which tends to conform the image presented to a user as closely and seamlessly as possible when the user toggles between a media presentation that is non-interactive (or largely so) and a fully interactive VU location.

To achieve such a function, the invention leverages the metadata currently being imbedded in many media presentations, and 3-D movies in particular, which identifies the location and time period depicted in particular scenes and may also include point of view information. For existing movies and other media presentations that do not include such information in their current form, such information can be collected in a number of ways such as by computing point of view from various features of a scene (e.g. by triangulation), collecting location information through viewer interaction or production documentation of media presentations and the like. Many such existing media presentations are being duplicated for sale or distribution in technologically more modern forms such as digital video disks on which the inclusion of such information can be readily achieved and is routinely done at least to the extent of identifying individual scenes to provide rapid access thereto.

In regard to VU locations, metadata identifying the location, time period and many other characteristics of the VU location must be developed and maintained as an incident of creation of the VU location and are thereafter available for use in the practice of the invention. The point of view of the presentation of an image of the VU location to a user is defined by the orientation and position of an avatar within a particular VU location. Thus information necessary to support the function and effects of the invention is always available for the current VU location of an avatar and is currently available for a limited number of current media presentations and can be collected or computed for others on an as-needed basis and the information retained for future use.

In FIG. 2, location correspondence service 250 is depicted as functionally located between a client terminal 120 and a server 110. It is to be understood, however, that server 110 need not be topologically or physically adjacent the client in the network but could be associated with any networked server or even contained in any client, including the user's terminal. The depiction of FIG. 2 such that the proxy is conveniently located, logically, such that it can receive input information directly from the client control, communications and inputs while being interposed in VU location communications between the client and server and/or network 105 in regard to communications other than for purposes of the VU in order to bi-directionally communicate with both a VU and a source of media presentations as well as to receive avatar and object information communicated incident to operation of the VU system in regard to client 110. Such a functional location also is preferred to facilitate the invention operating in the "background" as a proxy service to monitor the location viewed by the user regardless of which of a VU location and a media presentation is viewed.

Figure 3:
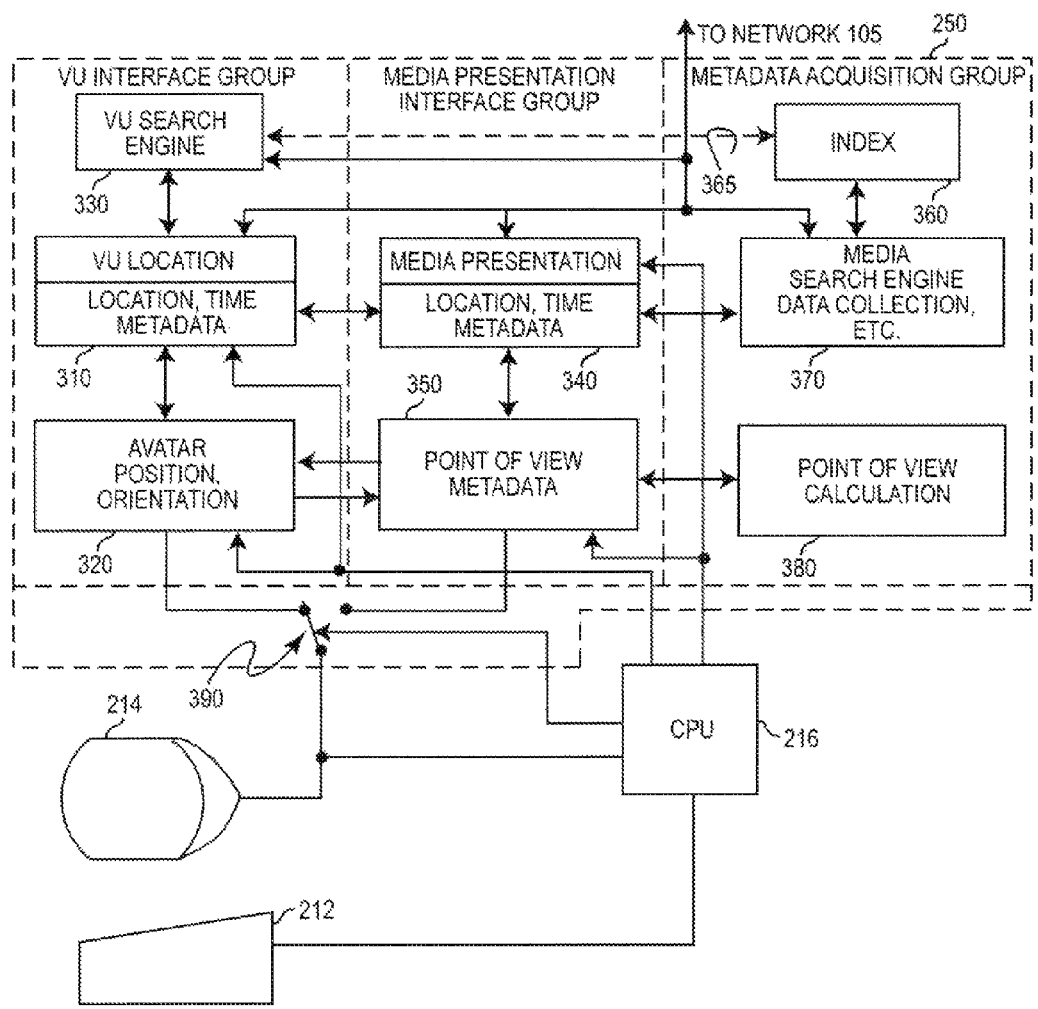
FIG. 3 is a high-level block diagram or data flow diagram of user controls and a proxy service in accordance with the invention

Referring now to FIG. 3, a preferred architecture for location correspondence service 250 will now be explained. As indicated in FIG. 3, the location correspondence service is necessarily associated with a networked computer or terminal comprising, for example, input device(s) 212, display 214 and central processing unit (CPU) 216 but need not be principally implemented thereon and, as alluded to above, is preferably implemented principally on a server to facilitate communications across network 105 of FIG. 1 to interact with a virtual universe and any source of media presentations and to obtain metadata in regard to them.

In general organization, location correspondence service 250 includes three groups of functional elements (illustrated in three columns in FIG. 3): a VU interface group including VU location storage 310, avatar position and orientation storage 320 and preferably, a VU search engine 330 for searching accessible virtual universes for metadata corresponding to respective locations therein; a media presentation interface group comprising media presentation metadata storage 340 and point of view metadata 350; and a metadata acquisition group comprising a media search engine 370 for developing index 360 which will speed response time as the invention is used and a point of view calculation arrangement 380. The first two of these groups are generally parallel in functionality and an output can be taken from either as indicated by switch 390 while the third, metadata acquisition group functions to obtain metadata to be used by the second, media presentation interface group while metadata is necessarily available in regard to the first, VU interface group as alluded to above. Corresponding functional elements of the VU interface group and the media presentation interface group preferably interact with each other to improve the correspondence of views presented when a transition is performed between them in accordance with switch 390. It is assumed that appropriate processing for operating a viewer for the media presentation and for interaction with a VU are concurrently running on CPU 216 and either or both can be controlled in accordance with user instructions input at 212 which should be understood to depict any combination of one or more input devices such as a keyboard, mouse, touch pad, microphone and the like. It is also assumed that the user is interacting with the VU or passively viewing the media presentation which will be referred to hereinafter as the current activity.

If the virtual universe is the current activity, the user's avatar will be in a particular location and will have a position and orientation within that location. If the user then wishes to toggle to a corresponding media presentation, the location and time metadata of the location stored at 310 are communicated to the media presentation metadata storage 340 and, if the communicated metadata does not match that which is currently stored therein, a search query is formulated in connection therewith and forwarded to the media search engine 370 which searches for a matching media presentation. When a media presentation is found that matches the query in time and location in regard to at least some content thereof, the part of the media presentation is returned to media presentation storage 340 from which it can be played out. It is also preferably accumulated in an index for future reference to increase response speed with continued use. It is preferred that the index 360 be centrally available for that reason and to rapidly accumulate the results of searches by all users of the invention that are connected through network 105. An example of data that might be accumulated might be:

<media> Raiders of the Lost Ark</media>
<VU location>Island N</VU location>
<time in media>0:23:00</time in media>
<location> Nepal</location>
<time period>1930s</time period> such that a common time and location can be associated with both a VU location and a scene of a media presentation. Other information can be gathered and included such as:

```
<location type>cave</location type>
<camera position>20.41,47.35</camera position>
<camera angle>close-up,WNW,horiz</camera angle>.
```

Raiders of the Lost Ark is a Lucasfilm Ltd. production distributed by Paramount Pictures. Similar databases currently exist for audio works allowing them to be accessed by artists, titles or other information.

In a largely parallel manner the current position and orientation of the avatar in the VU location stored at 320 which defines the point of view of the avatar is transferred to point of view metadata storage through which the media presentation is played out. While playing out the media presentation, the point of view therein can be determined by calculation at 380 from features of the landscape or the like and, if the point of view does not match that of the avatar, the image can be zoomed, panned, morphed or the like which are known image processing techniques to at least decrease the dissimilarity of views when the transition is completed at switch 390 although such image processing is not critical to the successful practice of the invention in accordance with its basic principles.

If, on the other hand, a media presentation is the current activity when the user desires a transition to a VU, the media presentation is necessarily being played out and metadata corresponding to the current scene may be available from imbedded data in the media presentation. If not, however, a search can be conducted by media search engine 370 for location, time, point of view and the like data that may be available from any of a number of sources (including index 360 as it is developed during use of the invention) to correspond to the scene. Again, the point of view can be calculated at 380 if needed. (Point of view correspondence should be regarded as a perfecting feature of the invention which is not necessary to the successful practice of the invention in accordance with its most basic principles since it principally serves to minimize the change of image presented to the user when a transition is requested to make the transition as seamless as possible.)

When it is desired to toggle from a media presentation to a VU (or, optionally, when a scene or location is changed in the media presentation or VU location, respectively, to increase response speed of the invention), the location and time metadata from the media presentation is transferred to the VU metadata storage 310. If the transferred metadata does not match the metadata previously stored, a search may be performed by VU search engine 330 to find a corresponding VU location and the avatar teleported to it. Similarly, the point of view metadata 350 is transferred to avatar position and orientation storage 320 to control the position and orientation of the avatar within the retrieved VU location which is either current or retrieved via VU search engine 330.

Thus, the location, time point of view and any other desired parameters (e.g. style, peer ratings, descriptions, graphics quality, etc.) of both the VU and media presentation can be kept synchronized in substantially real time or at least synchronized when a transition is to be made. In the latter case, it may be advantageous between transition commands from a user to use the invention to build index 360 by finding VU locations using VU search engine 330 that have not been indexed and to use media search engine 370 to locate or collect metadata for media presentations which correspond thereto which can then be stored in index 360, as generally indicated by dashed double arrow 365.

Figure 4:
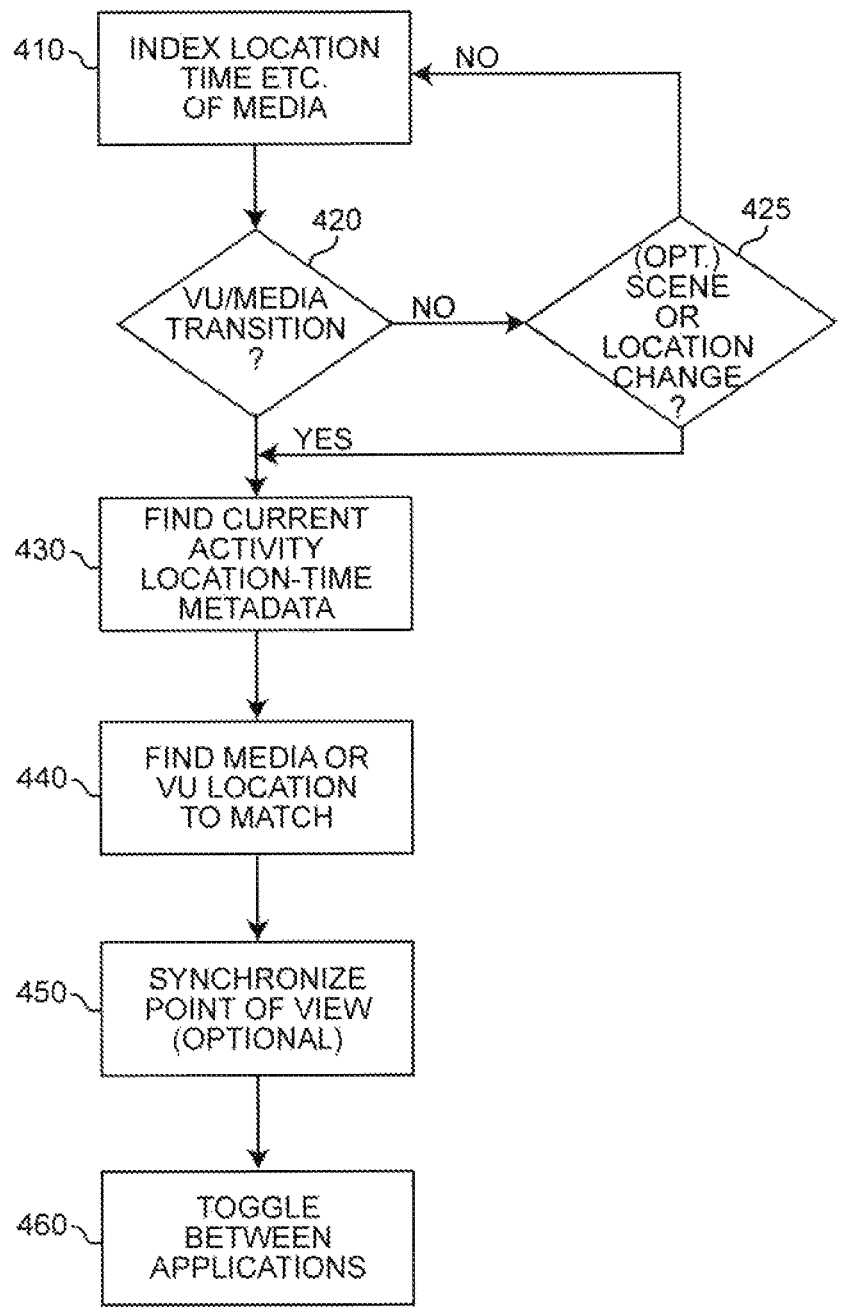
FIG. 4 is a flow chart illustrating operation of the invention.

To summarize the operation of the invention with reference to the flow chart of FIG. 4, the process starts with the indexing of media presentation metadata in regard to location, time, point of view and any other desired parameters in correspondence with VU locations as depicted at 410. It is preferred to make the index content addressable or at least addressable by either media presentation or VU location metadata. It should be appreciated that a scene may change in a media presentation while it is being viewed or a user can change avatar location in a VU during a single VU session. Thus toggling between the VU and a given media presentation will not always be a matter of merely switching between views of the same, static location and corresponding information should be accessible with information from the current activity, regardless of whether the current activity is a VU session or a media presentation so that a corresponding location and time and, preferably, point of view can be found for the other activity to which it is desired to switch. Speed of response to a transition command from a user is of high importance and thus the development of index 360 is of high importance as well to avoid response being delayed by conducting a real-time search after a transition command is issued but before the transition can be made.

Next, as depicted at 420, a user command for a transition between VU and media applications is detected. If not, a scene of VU location change can optionally be detected by monitoring metadata in storage 310 and 340. Doing so will allow a somewhat more rapid accumulation of cross-indexed metadata in index 360 but, more importantly, will maintain substantial synchronization between them so that toggling between applications can present corresponding views to the user more rapidly when toggling is commanded. If change detection 425 is not provided, however, the invention simply assumes a standby state by looping to the indexing operation 410 that could, advantageously, include searching for media presentations that correspond to VU locations, as alluded to above.

When a transition command is detected, the location, time and other parameter metadata for the current activity is found as depicted at 430 and corresponding metadata is determined, preferably from index 360 but through searching if corresponding data has not yet been indexed. A closest match is determined as depicted at 440. Then, optionally, the point of view may be synchronized, for example, by calculation at 380, and using interactivity of which a media presentation may be capable or by image processing or by orientation of an avatar, depending on the current activity as depicted at 450. At this point, the view presented to the user by the VU location and the media presentation will be as consistent as possible and switch 390 can be operated to change from one application to the other. It is preferred, when toggling is performed as depicted at 460, to "pause" operation of the other application to allow re-entry to it at the same point unless the scene is changed while in the other application, in which case, it will generally be desirable to return to a different location corresponding to the changed scene in the current activity. However, returning to the same location in the prior activity can be easily provided by storing the state of the prior activity in the nature of a "pause" operation. It may also be desirable from a network usage and computer overhead viewpoint to provide for opening a VU application upon detection 420 if not already open and to close the VU application when a return is made to the media presentation although response speed would likely be slowed somewhat.

In view of the foregoing, it is seen that the invention provides a location correspondence service that allows a user of a networked computer or terminal to participate in a VU or to view a media presentation such as a 3-D movie to conveniently and quickly find a corresponding location in a media presentation or VU, respectively, and to transition between them at will effortlessly and virtually seamlessly. Thus, interactivity can be provided for a media presentation and a further media presentation experience can be provided to enhance a VU session. The invention can be deployed as a service by implementing the invention as software which can be downloaded or otherwise accessed by the user based on a subscription or other arrangement. The invention also can provide such functions in a particularly useful manner by the simple expedient of developing VU locations which specifically correspond to particular media presentations as might, for example, be provided by producers or broadcasters of documentary films, educational programming and the like for which subscription fees may be similarly charged or sponsorships arranged and possibly administered through the VU. Advertising and/or promotional materials could also be distributed through the VU in connection with particular media presentations.

While shown and described herein as a method and a system, it is understood that the invention further provides various alternative embodiments. For example, in one embodiment shown in FIG. 5, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method for associating an interactive virtual universe (VU) and a non-interactive movie, comprising
    obtaining metadata pertaining to either said non-interactive movie or said interactive VU, said metadata describing at least a first location in a scene of said non-interactive movie or a second location in a setting of said interactive VU, wherein said non-interactive movie and said interactive VU are accessible through a networked computer including a display;
    when said metadata pertain to said non-interactive movie, conducting a search of said interactive VU or an index therefor for a setting having at least a third location which matches said first location obtained in said obtaining step;
    when said metadata pertain to said interactive VU, conducting a search of scenes in said non-interactive movie or an index therefor for a scene with at least a fourth location which matches said second location obtained in said obtaining step; and
    while said display is displaying to a user either (i) a view of said scene of said non-interactive movie having said first location or (ii) a view of said setting in said interactive VU having said second location,
        receiving in said networked computer a transition command from said user,
        if said display is displaying said view (i) when said transition command is received, toggling said display to a view of said setting in said interactive VU having said third location, and
        if said display is displaying said view (ii) when said transition command is received, toggling said display to a view of said scene of said non-interactive movie having said fourth location;
    wherein said non-interactive movie and said interactive VU are displayed only one at a time, and wherein said steps of obtaining metadata and conducting searches are performed autonomously by one or more networked computers prior to said step of receiving said transition command from said user.

2. The method as recited in claim 1, further including
obtaining additional metadata describing a first point of view in either said non-interactive movie or said interactive VU,
when said additional metadata pertain to said non-interactive movie, finding in said interactive VU a second point of view similar to said first point of view, and
when said additional metadata pertain to said interactive VU, finding a scene in said non-interactive movie with a third point of view similar to said first point of view.

3. The method as recited in claim 1, further comprising determining a first point of view either in said non-interactive movie or in said interactive VU, wherein said step of determining includes a computation based on locations of objects visible on said display,
when said metadata pertain to said non-interactive movie, finding in said interactive VU a second point of view similar to said first point of view, and
when said metadata pertain to said interactive VU, finding a scene in said non-interactive movie with a third point of view similar to said first point of view.

4. The method as recited in claim 3, wherein said computation is a triangulation computation.

5. The method as recited in claim 1,
wherein said metadata obtained in said obtaining step further describes a first time in said scene of said non-interactive movie or a second time in said setting of said interactive VU,
wherein said step of conducting a search of said interactive VU or an index thereof includes, from among settings having said third location, searching for a setting also having a third time which matches said first time obtained in said obtaining step,
wherein said step of conducting a search of scenes in said non-interactive movie or an index thereof includes, from among scenes having said second location, searching for a scene also having a fourth time which matches said second time obtained in said obtaining step,
wherein said display is toggled to a view of said setting in said interactive VU having at least said third location and said third time if, when said transition command is received, said display is displaying a view of said scene of said non-interactive movie having said first location and said first time, and
wherein said display is toggled to a view of said scene of said non-interactive movie having at least said fourth location and said fourth time if, when said transition command is received, said display is displaying a view of said scene of said non-interactive movie having said second location and said second time.

6. A non-transitory computer readable medium comprising instructions which, when run on a computer, cause the computer to perform steps of
obtaining metadata pertaining to either a non-interactive movie or an interactive VU, said metadata describing at least a first location in a scene of said non-interactive movie or a second location in a setting of said interactive VU, wherein said non-interactive movie and said interactive VU are accessible through said computer including a display;
when said metadata pertain to said non-interactive movie, conducting a search of said interactive VU or an index therefor for a setting having at least a third location which matches said first location obtained in said obtaining step;
when said metadata pertain to said interactive VU, conducting a search of scenes in said non-interactive movie or an index therefor for a scene with at least a fourth location which matches said second location obtained in said obtaining step; and
while said display is displaying to a user either (i) a view of said scene of said non-interactive movie having said first location or (ii) a view of said interactive VU having said second location,
receiving in said computer a transition command from said user,
if said display is displaying said view (i) when said transition command is received, toggling said display to a view of said setting in said interactive VU having said third location, and
if said display is displaying said view (ii) when said transition command is received, toggling said display to a view of said scene of said non-interactive movie having said fourth location;
wherein said non-interactive movie and said interactive VU are displayed only one at a time, and
wherein said steps of obtaining metadata and conducting searches are performed autonomously by said computer prior to said step of receiving said transition command from said user.

7. The non-transitory computer readable medium as recited in claim 6, further comprising additional instructions which, when run on said computer, cause the computer to perform further steps including
obtaining additional metadata describing a first point of view in either said non-interactive movie or said interactive VU,
when said additional metadata pertain to said non-interactive movie, finding in said interactive VU a second point of view similar to said first point of view, and
when said additional metadata pertain to said interactive VU, finding a scene in said non-interactive movie with a third point of view similar to said first point of view.

8. The non-transitory computer readable medium as recited in claim 6, further comprising additional instructions which, when run on said computer, cause the computer to perform further steps of
determining a first point of view either in said non-interactive movie or in said interactive VU, wherein said step of determining includes a computation based on locations of objects visible on said display,
when said metadata pertain to said non-interactive movie, finding in said interactive VU a second point of view similar to said first point of view, and
when said metadata pertain to said interactive VU, finding a scene in said non-interactive movie with a third point of view similar to said first point of view.

9. The non-transitory computer readable medium as recited in claim 8, wherein said computation is a triangulation computation.

10. The non-transitory computer readable medium as recited in claim 6,
wherein said metadata obtained in said obtaining step further describes a first time in said scene of said non-interactive movie or a second time in said setting of said interactive VU,
wherein said step of conducting a search of said interactive VU or an index thereof includes, from among settings having said third location, searching for a setting also having a third time which matches said first time obtained in said obtaining step, wherein said step of conducting a search of scenes in said non-interactive movie or an index thereof includes, from among scenes having said second location, searching for a scene also having a fourth time which matches said second time obtained in said obtaining step, wherein said display is toggled to a view of said setting in said interactive VU having at least said third location and said third time if, when said transition command is received, said display is displaying a view of said scene of said non-interactive movie having said first location and said first time, and wherein said display is toggled to a view of said scene of said non-interactive movie having at least said fourth location and said fourth time if, when said transition command is received, said display is displaying a view of said scene of said non-interactive movie having said second location and said second time.

11. A computer-based apparatus for associating an interactive virtual universe (VU) and a non-interactive movie, comprising:

memory for storing metadata pertaining to either said non-interactive movie or said interactive VU, said metadata describing at least a first location in a scene of said non-interactive movie or a second location in a setting of said interactive VU;

one or more processors configured to run a search engine,
wherein when said metadata pertain to said non-interactive movie, said search engine conducts a search of said interactive VU or an index therefor for a setting having at least a third location which matches said first location, and
wherein when said metadata pertain to said interactive VU, said search engine conducts a search of scenes in said non-interactive movie or an index therefor for a scene with at least a fourth location which matches said second location;

a display configured to display said non-interactive movie and said interactive VU to a user, wherein said non-interactive movie and said interactive VU are displayed only one at a time;

said one or more processors configured to receive a transition command from said user while said display is displaying either (i) a view of said scene of said non-interactive move having said first location or (ii) a view of said setting in interactive VU having said second location;

wherein said display and said one or more processors are configured so that
if said display is displaying said view (i) when said transition command is received, said display is toggled to a view of said setting in said interactive VU having said third location, and
if said display is displaying said view (ii) when said transition command is received, said display is toggled to a view of said scene of said non-interactive movie having said fourth location;

wherein said search engine conducts said searches autonomously prior to said one or more processors receiving said transition command from said user.

12. The computer-based apparatus as recited in claim 11, wherein
said memory stores additional metadata describing a first point of view either in said scene of said non-interactive movie or in said interactive VU, and
when said additional metadata pertain to said non-interactive movie, said search engine finds in said interactive VU a second point of view similar to said first point of view, and
when said additional metadata pertain to said interactive VU, said search engine finds a scene in said non-interactive movie with a third point of view similar to said first point of view.

13. The computer-based apparatus as recited in claim 11, wherein said one or more processors are configured to determine a first point of view either in said scene of said non-interactive movie or in said interactive VU, wherein said determining includes a computation based on locations of objects visible on said display,
when said metadata pertain to said non-interactive movie, said search engine finds in said interactive VU a second point of view similar to said first point of view, and
when said metadata pertain to said interactive VU, said search engine finds a scene in said non-interactive movie with a third point of view similar to said first point of view.

14. The computer-based apparatus as recited in claim 13, wherein said computation is a triangulation computation.

15. The computer-based apparatus as recited in claim 11, further comprising
an index comprising a memory storing locations in said interactive VU and locations in scenes of said non-interactive movie.

16. The computer-based apparatus as recited in claim 11,
wherein said metadata stored in said memory further describes a first time in said scene of said non-interactive movie or a second time in said setting of said interactive VU,
wherein said search engine, when conducting a search of said interactive VU or an index thereof includes, from among settings having said third location, searching for a setting also having a third time which matches said first time,
wherein said search engine, when conducting a search of scenes in said non-interactive movie or an index thereof includes, from among scenes having said second location, searching for a scene also having a fourth time which matches said second time,
wherein said display is toggled to a view of said setting in said interactive VU having at least said third location and said third time if, when said transition command is received by said one or more processors, said display is displaying a view of said scene of said non-interactive movie having said first location and said first time, and
wherein said display is toggled to a view of said scene of said non-interactive movie having at least said fourth location and said fourth time if, when said transition command is received by said one or more processors, said display is displaying a view of said scene of said non-interactive movie having said second location and said second time.

* * * * *